United States Patent
Mahadevan et al.

(10) Patent No.: US 12,261,919 B2
(45) Date of Patent: Mar. 25, 2025

(54) SERVICE INSERTION IN A COMPUTER NETWORK USING DYNAMIC SERVICE PATH SELECTION

(71) Applicant: Cisco Technology, Inc., San Jose, CA (US)

(72) Inventors: Satish Kumar Mahadevan, San Ramon, CA (US); Laxmikantha Reddy Ponnuru, San Ramon, CA (US); Pritam Baruah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/328,300

(22) Filed: Jun. 2, 2023

(65) Prior Publication Data
US 2024/0406276 A1 Dec. 5, 2024

(51) Int. Cl.
*H04L 67/51* (2022.01)
*H04L 45/02* (2022.01)
*H04L 45/12* (2022.01)
*H04L 45/302* (2022.01)

(52) U.S. Cl.
CPC .............. *H04L 67/51* (2022.05); *H04L 45/02* (2013.01); *H04L 45/127* (2013.01); *H04L 45/306* (2013.01)

(58) Field of Classification Search
CPC ......... H04L 67/51; H04L 45/02; H04L 45/03; H04L 45/033; H04L 45/036; H04L 45/037; H04L 45/0377; H04L 45/127; H04L 45/306
See application file for complete search history.

(56) References Cited

U.S. PATENT DOCUMENTS

| | | | |
|---|---|---|---|
| 6,112,249 A * | 8/2000 | Bader | H04L 45/00 330/3 |
| 9,178,807 B1 | 11/2015 | Chua et al. | |
| 9,762,537 B1 * | 9/2017 | Eyada | H04L 45/02 |
| 11,245,614 B1 * | 2/2022 | Backes | H04L 12/4641 |
| 2004/0223495 A1 * | 11/2004 | Pachl | H04L 63/0263 370/395.31 |
| 2006/0291378 A1 * | 12/2006 | Brotherston | H04L 45/22 370/221 |
| 2007/0104106 A1 * | 5/2007 | Patel | H04L 45/02 370/254 |
| 2018/0309632 A1 | 10/2018 | Kompella et al. | |

(Continued)

FOREIGN PATENT DOCUMENTS

WO   WO-2020168872 A1 *   8/2020   ............. H04L 29/08

OTHER PUBLICATIONS

WO-2020168872-A1 (Year: 2020).*

(Continued)

*Primary Examiner* — Lance Leonard Barry
(74) *Attorney, Agent, or Firm* — Lee & Hayes, P.C.

(57) ABSTRACT

Techniques for enabling service insertion using dynamic service path selection are described herein. In some aspects, the techniques described herein relate to avoiding a service route that passes through a service router when the second-leg path from the service router to a destination router is unreachable. In some cases, the techniques described herein relate to avoiding a route that includes a service router that does not have a path to a viable target in a core service region.

17 Claims, 9 Drawing Sheets

(56) References Cited

U.S. PATENT DOCUMENTS

2021/0160179 A1      5/2021    Sundararajan et al.
2022/0006687 A1      1/2022    Mundaragi et al.

OTHER PUBLICATIONS

Ahmad, I., Namal, S., Ylianttila, M., & Gurtov, A. (2015). Security in software defined networks: A survey. IEEE Communications Surveys & Tutorials, 17(4), 2317-2346.

Paillisse, J., Portoles, M., Lopez, A., Rodriguez-Natal, A., Iacobacci, D., Leong, J., . . . & Hooda, S. (Nov. 2020). SD-access: practical experiences in designing and deploying software defined enterprise networks. In Proceedings of the 16th International Conference on emerging Networking Experiments and Technologies (pp. 496-508).

\* cited by examiner

SERVICE INSERTION IN A COMPUTER NETWORK USING DYNAMIC SERVICE PATH SELECTION

TECHNICAL FIELD

This present application pertains to the field of computer networking and more specifically, to techniques for control policy-based service insertion and/or data policy-based service insertion in a computer network.

BACKGROUND

In a computer network, service insertion is a widely used technique that allows network traffic to be intercepted and redirected to specific services for processing before being forwarded to the intended destination. This is typically accomplished using service routers, which may be deployed between network devices and intercept traffic to provide additional services, such as security, optimization, and analytics. One challenge pertaining to service insertion relates to ensuring that the service is applied to the appropriate data flow while minimizing the impact on network performance and availability. Moreover, there is a need for techniques that enable more efficient, effective, and fault-tolerant path selection in a network with a service mode enabled.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
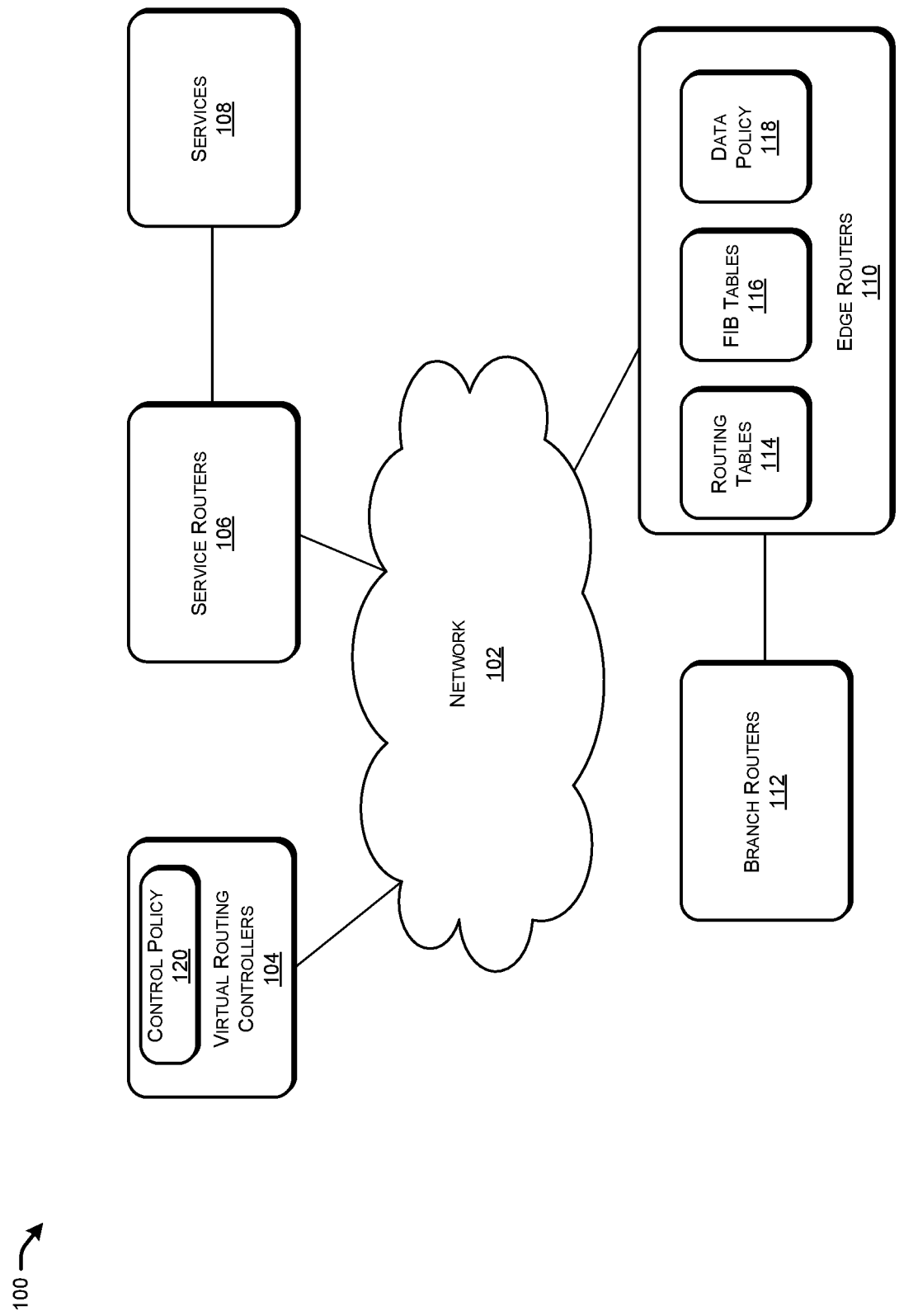
FIG. 1 provides a network architecture that enables service insertion in a computer network.

Techniques for improving the resiliency and reliability of service insertion using dynamic service path selection are described herein. In some aspects, the techniques described herein relate to a method including: determining that a network comprising a first router, a second router, and a third router is operating in a service mode; determining that a first path for data transmission from the first router to the second router is active, wherein the first path is associated with the third router; determining that the third router satisfies a service requirement associated with the service mode; and based on determining that the first path is active and the third router satisfies the service requirement, adopting the first path as a first viable service path for data transmission from the first router to the second router during the service mode.

Additionally, the techniques described herein may be performed by a system and/or device having non-transitory computer-readable media storing computer-executable instructions that, when executed by one or more processors, performs the method described above.

EXAMPLE EMBODIMENTS

Techniques for improving the reliability and resiliency of service insertion using dynamic service path selection are described herein. In some cases, the techniques described herein enable efficient and/or effective path selection in the context of a service mode enabled by either or both of control policy-based service insertion or data policy-based service insertion. In some cases, the techniques described herein address the problem of traffic blackholing caused by inactive or unreachable routes between routers in a network consisting of service routers, edge routers, and firewalls. In some cases, by dynamically updating the available service routes based on the network state resulted from the unreachability/inactivity of the route, the techniques described herein ensure that only valid and reachable service paths are selected for traffic transmission to service nodes, improving the performance and availability of the network.

For example, in some cases, the techniques described herein enable path selection in a network with service mode enabled by control policy-based service insertion. The network may include service routers, edge routers, and firewalls. In some cases, the techniques described herein address the issue of traffic blackholing caused by inactive routes between edge routers and service routers. In some cases, an example system addresses this issue by retrieving a network path from a routing table associated with a source router and determining an intermediate router associated with the retrieved network path. The routing table may indicate routing information about whether a destination router is reachable from an intermediate router that is associated with a service node. The system then retrieves a service database that contains information about the service routers and services deployed in the network. Based on the service database, the system determines whether the intermediate router is a service router that satisfies the service requirement associated with the service mode. If the intermediate router satisfies the service requirement, the system transmits the traffic using a service path that corresponds to the retrieved network path. If the intermediate router does not satisfy the service requirement, the system refuses to transmit the traffic using a service path that corresponds to the retrieved network path. In some cases, the described approach ensures that only reachable service paths are adopted, avoiding the adoption of an unreachable/inactive service path that may cause traffic blackholing problems. In some cases, by updating the service routes based on the network state, the example system improves the performance and availability of the network.

As another example, in some cases, the techniques described herein enable path selection in the context of service mode enabled by data policy-based service insertion. In some cases, the techniques described herein address the problem of traffic blackholing caused by inactive or unreachable routes between routers by dynamically updating the available service routes based on the network state resulted from the unreachability/inactivity of the route. The system identifies the available service paths represented by the source router's data policy and queries the FIB table associated with the source router to determine whether the service path corresponds to a valid network path described by the FIB table. The router transmits the traffic using the service path only if it corresponds to a valid network path, ensuring the path's reachability and avoiding traffic blackholing. In some cases, by enabling path selection using the techniques related to a service mode enabled by data policy-based service insertion, a router can prevent traffic blackholing issues caused by inactive or unreachable service routes. By dynamically filtering and pruning service paths based on the reachability and validity of network paths represented by the forwarding information base (FIB) table, the router can ensure that only valid and reachable service paths are selected for traffic transmission.

In some cases, the techniques described herein may be used in the context of software-defined networking (SDN). In some cases, SDNs may include multiple routers and switches that are managed by a central controller, which may use policies to control traffic flow in the network. The techniques described herein can be used to enable path selection in an SDN network by dynamically updating the available service paths based on the network state By enabling dynamic path selection in SDN networks, the techniques described herein can improve the overall performance and efficiency of the network.

In some cases, the techniques described herein may be used in the context of virtual private networks (VPNs). In some cases, VPNs may include multiple routers and switches that are used to securely transmit data between different locations or networks. The techniques described herein can be used to enable path selection in a VPN network by dynamically updating the available service paths based on the network state. By enabling dynamic path selection in VPN networks, the techniques described herein can improve the overall security and efficiency of the network.

In some cases, the techniques described enable dynamic updating of the available service paths based on the network state, thereby improving the performance and availability of the network. In addition, the dynamic updating of available service paths can prevent traffic blackholing caused by service routes that cannot reach intended destination routers, ensuring that only valid and reachable service paths are selected for traffic transmission. This can prevent delays or disruptions in network operations that can impact the performance and availability of the network. Furthermore, the described techniques can help reduce network congestion and improve network utilization by enabling path selection based on the current network state. By identifying and adopting service paths that are optimal for the current network state, the techniques can help to improve the overall efficiency of the network.

In some cases, the techniques described herein improve the overall reliability and resiliency of a network by enabling routers to avoid traffic blackholing via dynamically filtering and pruning service paths based on the reachability and validity of network paths represented by the forwarding information base (FIB) table. By ensuring that only valid and reachable service paths are selected for traffic transmission, the techniques described herein can minimize the impact of network failures or disruptions on the availability and performance of the network. Additionally, by enabling path selection in the context of service mode enabled by control policy-based service insertion and data policy-based service insertion, the techniques described herein provide greater flexibility and control over traffic routing in the network. In some cases, the techniques described herein enable more efficient use of network resources and improved traffic management, which can in turn lead to improved user experience and overall network performance. Overall, the described techniques provide a more robust and reliable network infrastructure that can better adapt to changing network conditions and support the evolving needs of modern network environments.

In some cases, the techniques described herein dynamic filtering and pruning service paths based on the reachability and validity of network paths represented by the forwarding information base (FIB) table, improving network routing efficiency and scalability.

In some cases, by selecting only viable service paths for traffic transmission, the techniques described herein can help optimize the use of network resources and prevent unnecessary traffic congestion. Furthermore, the described techniques can help reduce the load on network devices, such as firewalls and service routers, by ensuring that traffic is only routed through the most efficient and available paths. This can lead to a more efficient use of resources and reduce the risk of device overload and failure. In addition, by avoiding traffic blackholing and ensuring that traffic is always delivered to its intended destination, the described techniques can help improve the overall user experience and satisfaction.

In some cases, the techniques described herein enhance the security of network operations by preventing traffic blackholing, data loss, and disruptions that may occur when inactive or unreachable service routes are selected for traffic transmission. By ensuring that only valid and reachable service paths are adopted, the techniques described herein can prevent potential security breaches, improving the overall security and reliability of the network.

FIG. 1 provides an architecture 100 with several components to enable service insertion in a network 102. The network 102 may be a software-defined wide area network (SDWAN) having an SDWAN architecture. The SDWAN architecture may be a network architecture that uses software-based controllers to manage and orchestrate network traffic across multiple network connections, such as at least one of broadband internet, long-term evolution (LTE), and Multiprotocol Label Switching (MPLS) connections.

As depicted in FIG. 1, the architecture 100 includes, in addition to the network 102, a set of virtual routing controllers 104, a set of service routers 106, a set of edge routers 110, and a set of branch routers 112. A virtual routing controller 104 may be a software component that enables centralized management, configuration, and orchestration for the network 102 (e.g., for an SDWAN network). In some cases, a virtual routing controller 104 enables defining a network topology, creating routing policies, and/or monitoring network traffic associated with the network 102. An example of a virtual routing controller 104 is Cisco's vSmart controller.

In some cases, a virtual routing controller 104, such as Cisco's vSmart controller, can enforce a control policy 120 by providing centralized management and control of the network's routing policies. The control policy 120 may define how network traffic should be handled and processed by the routers and other network devices, including how services should be inserted and how traffic should be forwarded. The control policy 120 may be used by the virtual routing controller 104 to determine routes, and the routes are then distributed to the edge routers 110, branch routers 112, and/or other network devices (e.g., using a secure control plane protocol). The control policy 120 may include rules and policies that specify how network traffic should be classified, prioritized, and forwarded based on various parameters, such as the type of traffic, the source or destination internet protocol (IP) address, and/or the application being used. In some cases, the virtual routing controller 104 can enforce the control policy by determining routes in a manner that is configured to ensure that all routers and network devices in the network 102 are configured properly and are following the defined policies. The virtual routing controller 104 may also be configured to monitor the network 102 in real-time to detect any policy violations or misconfigurations and take corrective actions if needed.

A service router 106 may be a router that is configured to both forward network traffic across the network 102 and to enable access to one or more services (e.g., to one or more security functions, such as to one or more firewalls and/or intrusion detection and prevention systems (IDPSs)). In some cases, while all routers are responsible for forwarding packets between networks, service routers 106 are designed to provide specialized services that may be critical to the operation of the network 102. Examples of such services include security services, firewall protection services, traffic shaping services, Quality of Service (QOS) management services, virtual private network (VPN) connectivity services, content filtering services, and intrusion detection and prevention system (IDPS) services.

Examples of service routers 106 include border routers and transport routers. A border router may be configured to provide connectivity between different network segments in the network 102, such as by connecting an organization's internal network to the internet or to a partner network. A border router may provide additional security features such as firewall protection, intrusion detection and prevention, and VPN connectivity. Border routers may also perform network address translation (NAT) to enable multiple devices on a private network to share a single public IP address. Examples of border routers include Cisco Aggregation Services Routers (ASR) 1000 series and Cisco Integrated Services Routers (ISR) 4000 series. A transport router may be configured to transport data between different parts of a network. A transport router may be used to connect different branch offices, data centers, and/or cloud services. In some cases, transport routers typically do not include advanced security features. Examples of transport routers include Cisco Network Convergence System (NCS) 5500 series and Cisco ISR 1100 Series Integrated Services Routers.

In some cases, a service router 106 is configured to enable access to one or more network services 108. Examples of network services 108 include firewalls used to monitor and control incoming and outgoing network traffic, block unauthorized access, and prevent malware, viruses, and other security threats from entering the network. Other examples of network services 108 include IDPSs configured to detect and prevent network intrusions, such as malware, viruses, and other security threats. In some cases, the network services 108 include QOS management modules configured to prioritize network traffic to increase the likelihood that critical applications and services receive the necessary network resources. In some cases, the network services include content filtering modules configured to block access to certain types of websites or network content, such as to social media platforms or video streaming platforms.

In some cases, an edge router 110 is configured to forward traffic between: (i) the branch routers 112 and the service routers 106, and/or (ii) between the branch routers 112 and other edge routers 110. In some cases, an edge router is associated with at least one of a routing table 114 or a Forwarding Information Base (FIB) table 116. A routing table 114 may include at least one of a network address, a subnet mask, or a next-hop address for one or more other routers in the network 102. In some cases, the routing table 114 is a global routing table generated by merging routing recommendations of one or more routing protocols, such as the Open Shortest Path First (OSPF) protocol or the Border Gateway Protocol (BGP). An FIB table 116 may represent mapping of network addressing to next-hop interfaces and/or media access control (MAC) addresses. The FIB table 116 associated with a router may be generated based on the routing table 114 associated with the router.

In some cases, an edge router 110 is associated with a data policy 118. The data policy 118 may define how network traffic should be handled and processed by the router, including how services should be inserted and how traffic should be forwarded based on various parameters such as the type of traffic or its source. In some cases, the data policy 118 includes a set of advanced policy-based routing (PBR) rules that define how traffic should be classified, prioritized, and forwarded based on various parameters. In some cases, unlike the control policy 120 which is evaluated by the virtual routing controller 104 and not sent to the edge routers 110, the data policy 118 is provided to the edge routers 110. In some cases, the virtual routing controller 104 evaluates the control policy 120 and makes routing decisions based on the control policy 120. In some cases, the virtual routing controller 104 evaluates the data policy 118 and changes the routing information sent to the edge routers 110 based on the data policy 118. The edge routers 110 may use the routing information sent by the virtual routing controller 104 to enforce the data policy.

In some cases, a branch router 112 connects branch offices and/or branch nodes to the network 1022. Branch routers 112 can be deployed in different types of environments such as small branch offices, retail stores, and mobile sites. Branch routers 112 may be for forwarding traffic to the edge routers 110. An example of a branch router is the Cisco ISR 1000 series.

As described above, control policies and data policies can enable service insertion in a network, such as in a network having a SDWAN architecture. Service insertion may refer to the process of inserting a network service, such as a firewall, intrusion detection system, or content filtering, into a network path (e.g., to improve security and/or performance of the network). Service insertion can be enabled using both data policy and control policy. Control policy-based service insertion may include using a centralized virtual routing controller, such as the vSmart controller, to configure and manage the network's policies. The control policy may specify how traffic should be handled and processed by the routers and other network devices, including how services should be inserted and how traffic should be forwarded. The virtual routing controller may ensure that all routers and network devices in the network are configured correctly and are following the defined policies. Data policy-based service insertion may include using advanced policy-based routing (PBR) rules enforced on a router level to define how traffic should be forwarded. The data policy may be sent from the virtual routing controller to the edge routers and used to enforce service insertion at the edge router level.

In some cases, both control policy-based and data policy-based service insertion can be problematic, as both may cause traffic blackholing scenarios when a service is available, but the corresponding service router cannot reach the destination router associated with data transmission. This problem may occur because the network paths used for routing during a service mode are chosen statically without taking dynamic network state 200 into account. A service mode may be a mode of data transmission in which network traffic is first sent to a service router before being forwarded to its final destination. The service mode may be used when network services, such as firewalls or intrusion detection systems, need to inspect or modify the traffic before it reaches its destination. For example, in a scenario where a company's branch office needs to access a cloud-based application, the company may want to insert a firewall service in the network path to inspect and filter the traffic before it reaches the cloud application to increase network security. In service mode, the traffic from the branch office may be first sent to the service router, where it is inspected by the firewall service, before being forwarded to the cloud application. In some cases, when traffic is being transmitted in the data insertion mode, a service router is configured to enforce policies that define how traffic should be handled and processed by one or more services associated with the service router, such as policies defining which services should be applied. In some cases, service mode can provide greater security and control over network traffic, as it allows network administrators to apply network services and policies to the traffic before it reaches its final destination.

Figure 2:
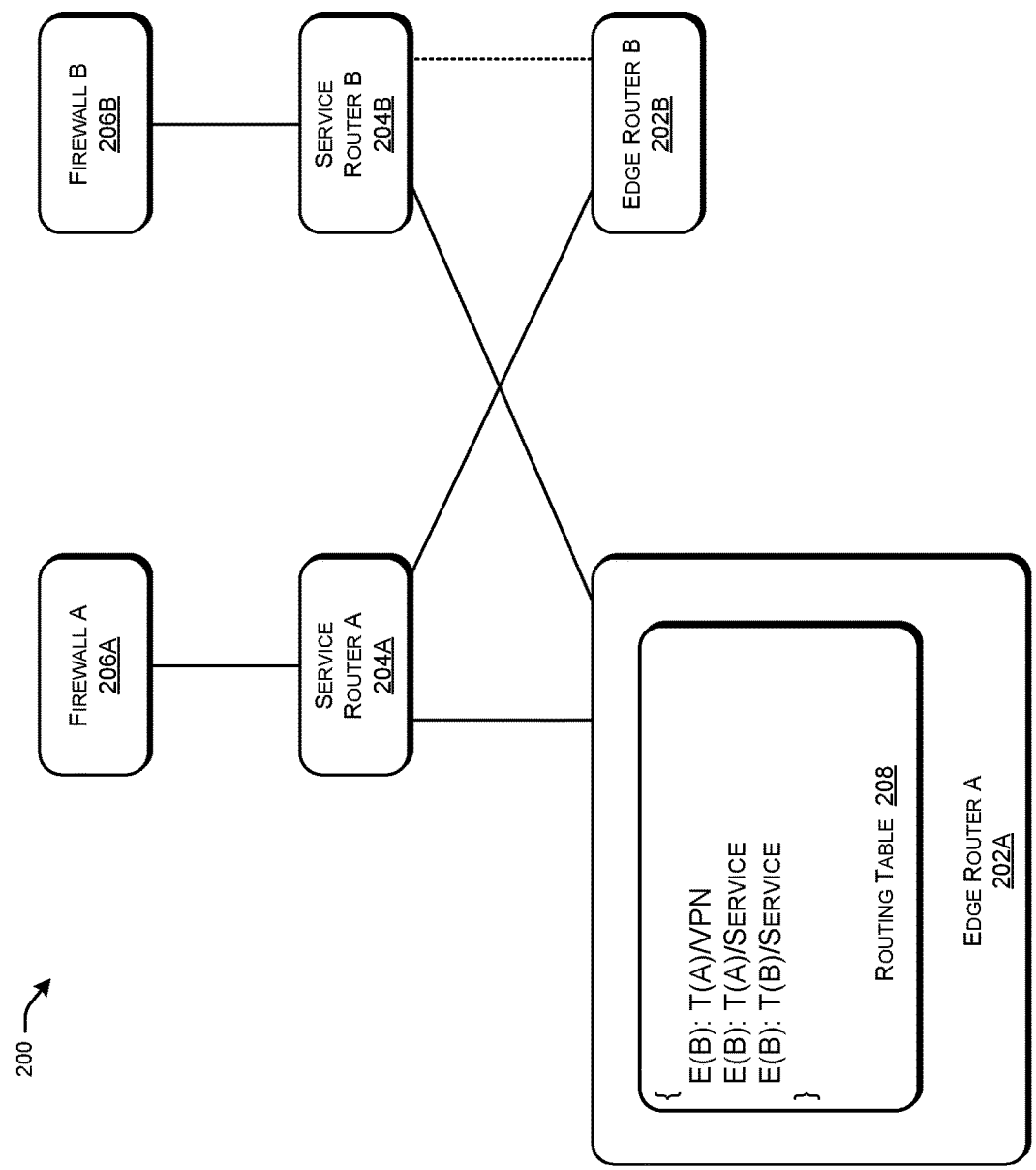
FIG. 2 provides an example network state in which service insertion is enabled using a control policy-based approach.
Figure 3:
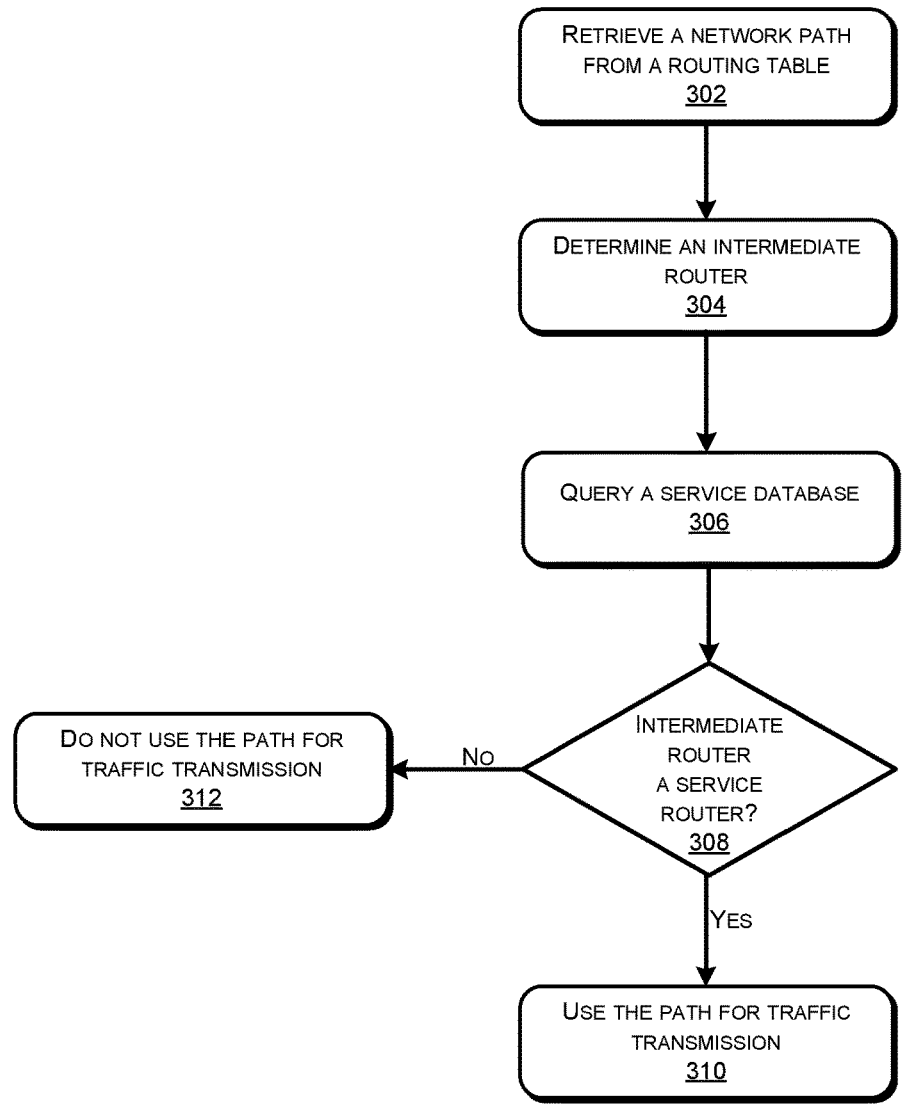
FIG. 3 is a flowchart diagram of an example process for path selection in the context of a service mode enabled by control policy-based service insertion.
Figure 4:
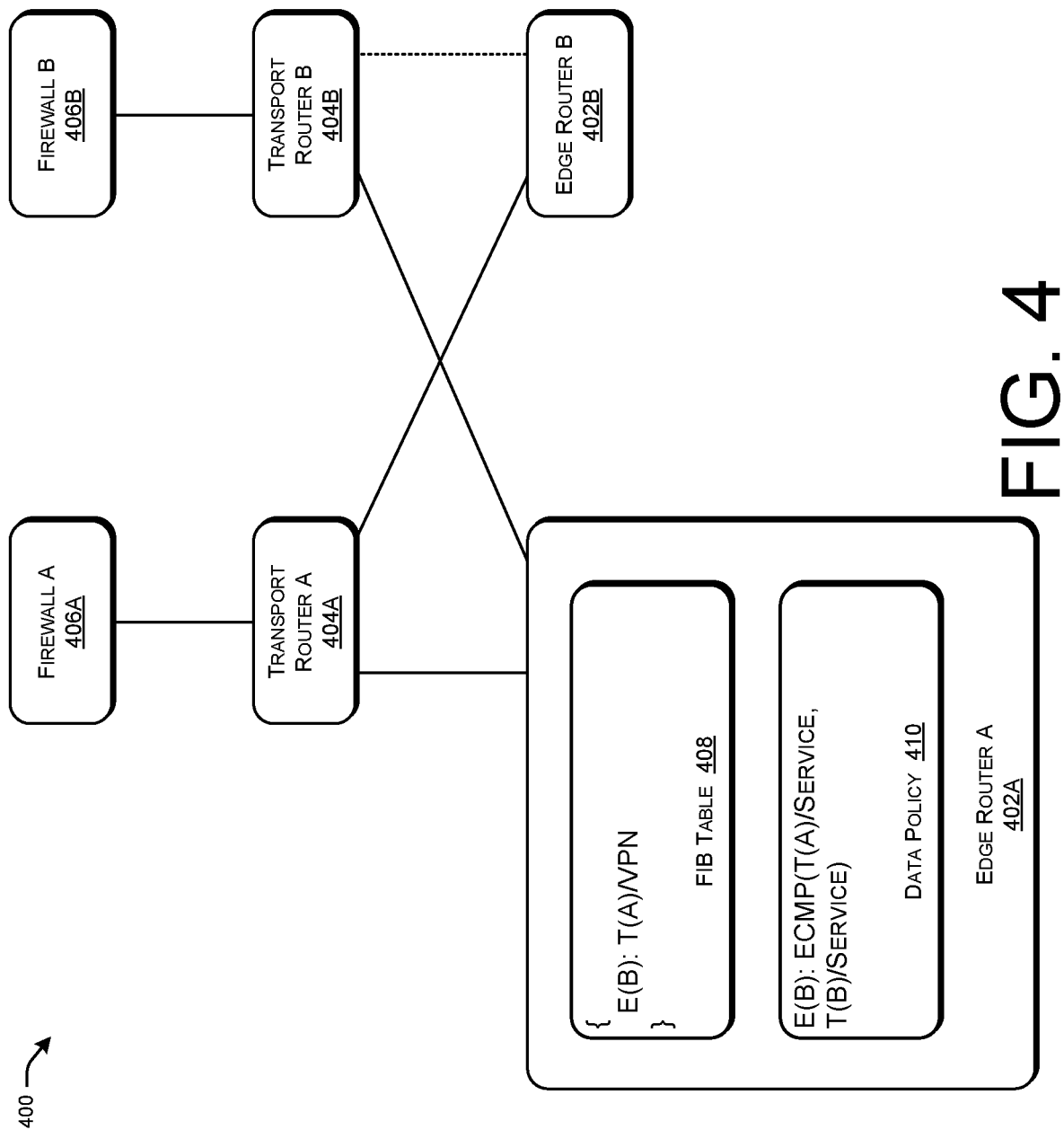
FIG. 4 provides an example network state in which service insertion is enabled using a data policy-based approach.
Figure 5:
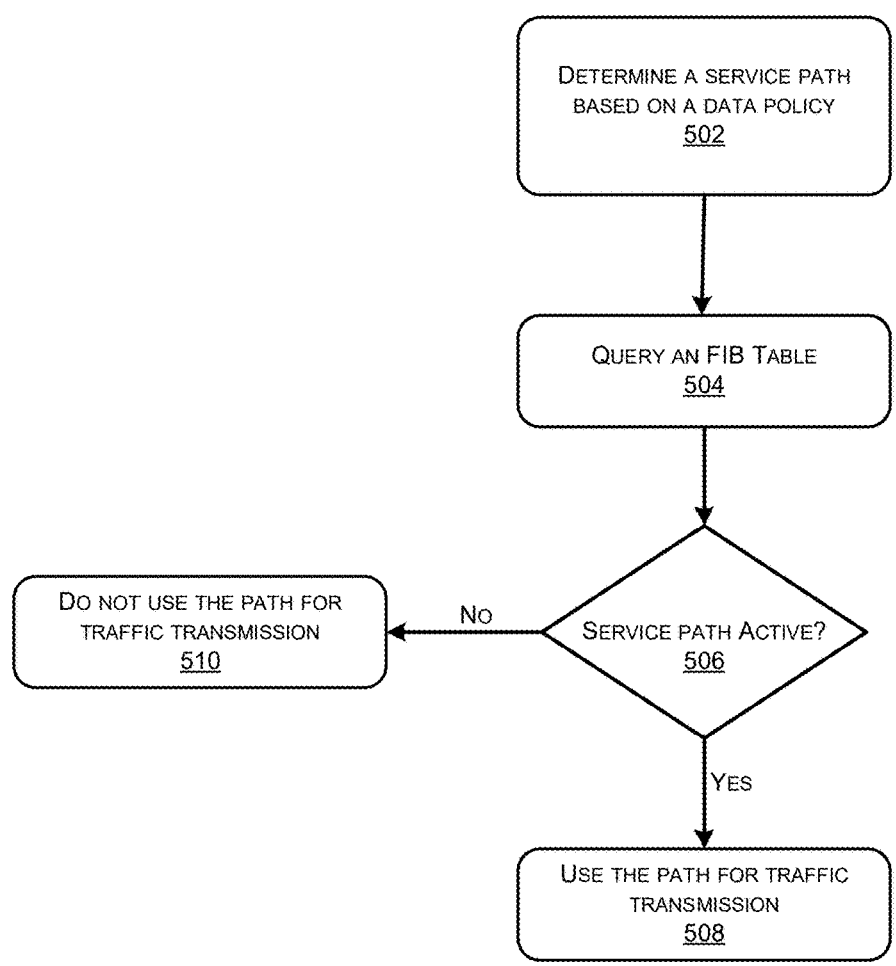
FIG. 5 is a flowchart diagram of an example process for path selection in the context of a service mode enabled by data policy-based service insertion.
Figure 6:
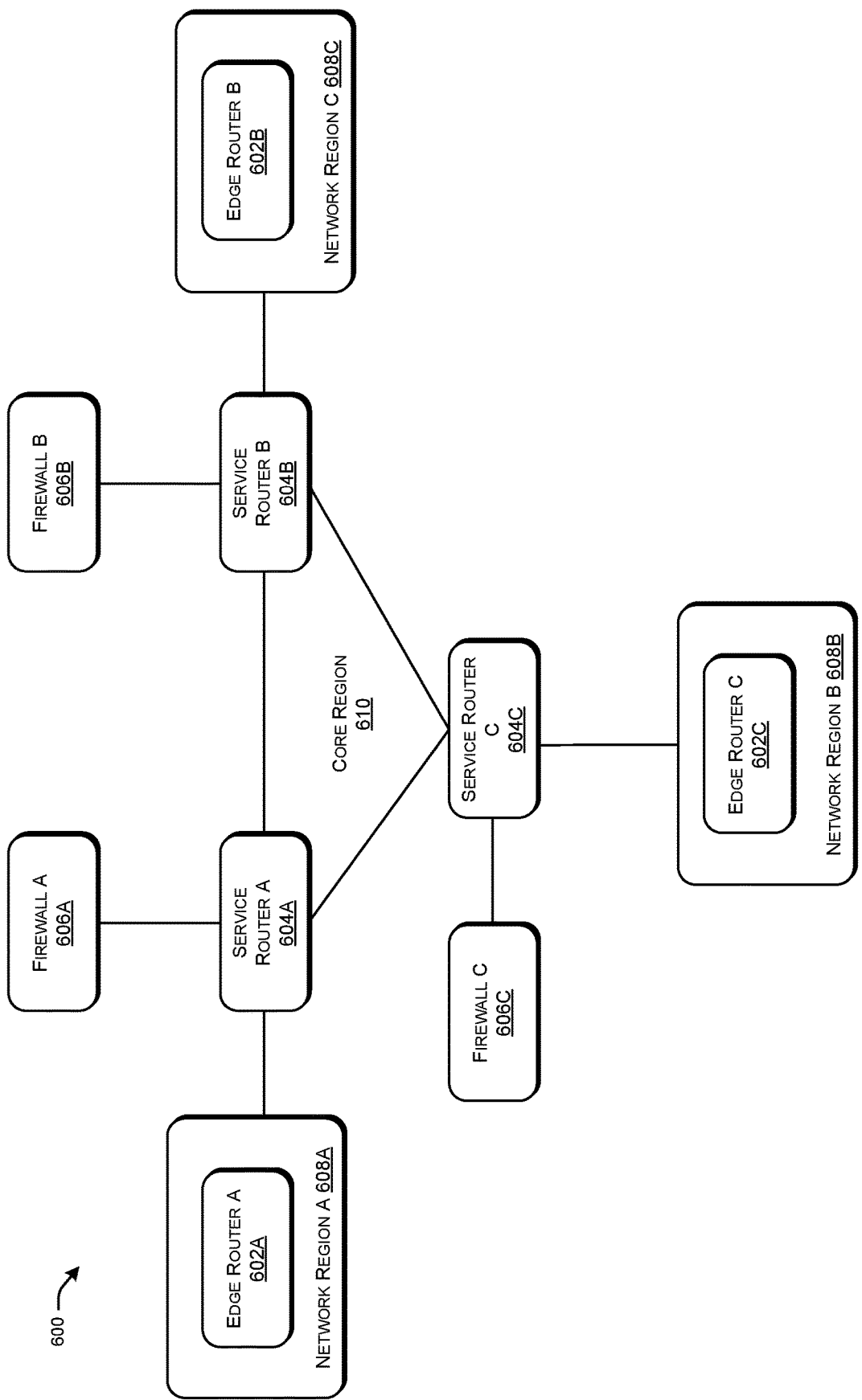
FIG. 6 provides an example network topology that includes service routers connected to each other at a core network region.

In the examples provided in FIGS. 2-6, example problems associated with control policy-based and data policy-based service insertion are described and example solutions are provided. In particular, FIG. 2 provides an example of a traffic blackholing scenario occurring as a result of control policy-based service insertion, while FIG. 3 provides example solutions to the problem depicted in FIG. 2. Furthermore, FIG. 4 provides an example of a traffic blackholing scenario occurring as a result of data policy-based service insertion, while FIG. 5 provides example solutions to the problem depicted in FIG. 4. Moreover, FIG. 6 provides an example of a traffic blackholing scenario occurring as a result of service insertion (e.g., control policy-based service insertion and/or data policy-based service insertion) in a core network region. The problem depicted in FIG. 6 can be solved using the example solutions provided herein for modifying control policy-based service insertion and/or data policy-based service insertion techniques to avoid traffic blackholing scenarios, such as the example solutions provided in FIG. 3 and in FIG. 5.

FIG. 2 provides an example network state 200 in which a firewall A 206A is deployed behind a service router A 204A and a firewall B 206B is deployed behind a service router B 204B. Service routers A-B 204A-204B may be transport routers. As further depicted in FIG. 1, the network state 200 also includes an edge router A 202A with the routing table 208 and an edge router B.

In some cases, the routing table 208 associated with the edge router A 202A represents that there is only conventional network path for data transmission to edge router B 202B: the path T(A)/VPN, where T(A) indicates that the next hop associated with the path is the service router A 204A and VPN indicates that path is a conventional network path that is used while data transmission is not performed in the service mode. The routing table 208 also represents that there are two service paths for data transmission to edge router B: (i) the path T(A)/Service, where T(A) indicates that the next hop associated with the path is the service router A 204A and Service indicates that path is a service path that is used while data transmission is performed in the service mode, or (ii) the path T(B)/Service, where T(B) indicates that the next hop associated with the path is the service router B 204B and Service indicates that path is a service path that is used while data transmission is performed in the service mode.

In the network state 200 of FIG. 2, the route between the edge router B 202B and the service router B 204B is inactive (represented by the corresponding graph edge having dashed lines), such that the edge router B 202B is unreachable from the service router B 204B. This may have occurred because the service router B 204B has detected that the edge router B 202B is unreachable and has transmitted an indication of this unreachability to the virtual routing controller, causing the controller to withdraw the path from the edge router A 202A to the edge router B 202B that passes through the unreachable/inactive route. However, while this unreachability is properly reflected in the network routes represented by the routing table 208 due to conventional routing policies, the control policy is static and fails to update the service routes based on the network state 200 resulted from the unreachability/inactivity of the route between edge router B 202B and the service router B 204B.

In the network state 200 of FIG. 2, the inactive route between the edge router B 202B and the service router B 204B can lead to traffic blackholing issues because the control policy fails to update the service routes based on the network state 200 resulted from the unreachability/inactivity of the route. As a result, the routing table 208 may still contain the inactive route, and the edge router A 202A may still send traffic to the edge router B 202B through that route during the service insertion, even though the route is unreachable. This can lead to traffic being dropped or lost, causing blackholing issues. For example, if the edge router A 202A sends traffic to the edge router B 202B during the service mode, but the route between the edge router B 202B and the service router B 204B is inactive. The routing table 208 may still contain the inactive service route, and the edge router A may still attempt to send traffic to the edge router B through that service route. However, because the edge router B 202B is unreachable from the service router B 204B, the traffic will be dropped, and the edge router A 202A will not receive any response. This can cause delays or disruptions in network operations and may impact the performance and availability of the network.

FIG. 3 is a flowchart diagram of an example process 300 for path selection in the context of a service mode enabled by control policy-based service insertion. The process 300 may be performed by a source router, which may be an edge router. The process 300 may be repeated for each network path in the routing table of the source router.

As depicted in FIG. 3, at operation 302, the process 300 includes retrieving a network path from a routing table associated with a source router. The network path may be a path that is used for transmitting traffic from the source router to a destination router in the service mode. Operation 302 may be performed when the source router receives a request to transmit traffic to the destination route in the service mode. In response to the request, the source router may retrieve the network path to the destination route from the routing table associated with the source router. For example, in the operational example of FIG. 2, edge router A 202A may be the source router and may retrieve the network route T(A)/VPN to the destination edge router B 202B from the routing table 208 associated with the edge router A 202A.

At operation 304, the process 300 includes determining an intermediate router associated with the retrieved network path. In some cases, the intermediate router may be the next-hop router indicated by the routing table in relation to the retrieved network path. For example, in the operational example of FIG. 2, edge router A 202A may determine that the service router A 204A is an intermediate router for the retrieved network route T(A)/VPN.

At operation 306, the process 300 includes retrieving a service database. The service database may be a repository (e.g., a centralized repository, such as a centralized repository maintained by a virtual routing controller) may be a centralized repository that contains information about the service routers and/or the services deployed in a network. The service database may include a list of all the service routers in the network, as well as the services that are deployed behind each service router. In some cases, the service database contains detailed information about the configuration and deployment of each service in the network, including the service type, location, status, and associated policies. For example, the service database can be accessed by network administrators and other authorized users to manage and configure the services in the network.

For example, in the operational example of FIG. 2, a service database associated with the depicted network may describe at least one of the following: (i) that service router A 204A is a service router, (ii) that service router B 204B is a service router, (iii) that the firewall A 206A is deployed behind the service router A 204A, or (iv) that the firewall B 206B is deployed behind the service router B 204B.

At operation 308, the process 300 includes determining, based on the service database, whether the intermediate router is a service router that satisfies the service requirement associated with the service mode. The intermediate router may be a router configured using routing protocols that is used to access a service (e.g., behind which a service is deployed). For example, in the operational example of FIG. 2, if the service requirement associated with the service mode requires processing traffic with a firewall before routing the traffic to the destination router, the edge router A 202A may determine that the service router A 204A, which is the intermediate router for the retrieved network route T(A)/VPN, satisfies that service requirement. Accordingly, a router may satisfy the service requirement if the router is used to access a service, even if the router is configured using routing protocols.

The service mode may represent one or more services that are required for a data transmission performed using the service mode. The required services associated with a service mode may define the service requirement of the service mode. In some cases, different data transmissions in a network may require different service modes, depending on the type of service being inserted and the specific requirements of the transmission. For example, in a network that transmits both data traffic and voice traffic, the data traffic may require firewall services and content filtering services, which can be handled by service routers that have support firewall services and content filtering services. However, the voice traffic may require quality-of-service (QOS) management services, which are best handled by service routers that support the QOS management services.

At operation 310, the process 300 includes transmitting the traffic based on the retrieved network path based on (e.g., in response to) determining that the intermediate route associated with the retrieved network path satisfies the service requirement associated with the service mode. In some cases, based on determining that the intermediate route associated with the retrieved network path satisfies the service requirement associated with the service mode, the router transmits the traffic using a service path that corresponds to the retrieved network path.

In some cases, because the adopted service path corresponds to a network path and because reachability of network paths is dynamically updated using conventional routing policies, the adopted service path is ensured to be reachable. For example, in the operational example of FIG. 2, because the service path T(B)/Service does not correspond to a valid network path, the service path T(B)/Service is not adopted, thus avoiding adoption of an unreachable/inactive service path that may cause traffic blackholing problems.

At operation 312, the process 300 includes refusing to transmit the traffic based on the retrieved network path based on (e.g., in response to) determining that the intermediate route associated with the retrieved network path does not satisfy the service requirement associated with the service mode. In some cases, based on determining that the intermediate route associated with the retrieved network path does not satisfy the service requirement associated with the service mode, the router refuses to transmit the traffic using a service path that corresponds to the retrieved network path.

FIG. 4 provides an example network state 400 in which a firewall A 406A is deployed behind a service router A 404A and a firewall B 406B is deployed behind a service router B 404B. Service routers A-B 404A-404B may be transport routers. As further depicted in FIG. 1, the network state 400 also includes an edge router A 402A with the routing table 408 and a data policy 410, as well as an edge router B.

In some cases, the FIB table 408 associated with the edge router A 402A includes forwarding data representing that there is only conventional network path for data transmission to edge router B 402B: the path T(A)/VPN, where T(A) indicates that the next hop associated with the path is the service router A 404A and VPN indicates that path is a conventional network path that is used while data transmission is not performed in the service mode.

In some cases, the data policy 410 associated with the edge router B 402B indicates that, when in a service mode, the next-hop for data transmission to the edge router B 402B can be selected (e.g., using a routing protocol such as the equal-cost multi-path routing (ECMP) protocol) from the service router A 204A or the service router B 204B. Accordingly, the data policy 410 includes policy data representing that there are two service paths for data transmission to edge router B: (i) the path T(A)/Service, where T(A) indicates that the next hop associated with the path is the service router A 404A and Service indicates that path is a service path that is used while data transmission is performed in the service mode, or (ii) the path T(B)/Service, where T(B) indicates that the next hop associated with the path is the service router B 404B and Service indicates that path is a service path that is used while data transmission is performed in the service mode.

In the network state 400 of FIG. 4, the route between the edge router B 402B and the service router B 404B is inactive (represented by the corresponding graph edge having dashed lines), such that the edge router B 402B is unreachable from the service router B 404B. This may have occurred because the service router B 404B has detected that the edge router B 402B is unreachable and has transmitted an indication of this unreachability to the virtual routing controller, causing the controller to withdraw the path from the edge router A 402A to the edge router B 402B that passes through the unreachable/inactive route. However, while this unreachability is properly reflected in the network routes represented by the FIB table 408 due to conventional routing path selection/convergence, the data policy is static and fails to update the network routes based on the network state 400 resulted from the unreachability/inactivity of the route between edge router B 402B and the service router B 404B.

In the network state 400 of FIG. 4, the inactive route between the edge router B 402B and the service router B 404B can lead to traffic blackholing issues because the data policy 410 fails to update the available service routes based on the network state 400 resulted from the unreachability/inactivity of the route. As a result, the data policy 410 may still select the inactive route, and the edge router A 402A may still send traffic to the edge router B 402B through that route during the service insertion, even though the send-leg of the route is unreachable. This can lead to traffic being dropped or lost, causing blackholing issues. For example, if the edge router A 402A sends traffic to the edge router B 402B during the service mode, but the route between the edge router B 402B and the service router B 404B is inactive. The data policy 410 may still select the non-viable service route, and the edge router A may still attempt to send traffic to the edge router B through that service route. However, because the edge router B 402B is unreachable from the service router B 404B, the traffic will be dropped, and the edge router A 402A will not receive any response. This can cause delays or disruptions in network operations and may impact the performance and availability of the network.

FIG. 5 is a flowchart diagram of an example process 500 for path selection in the context of a service mode enabled by data policy-based service insertion. The process 500 may be performed by a source router, which may be an edge router. The process 500 may be repeated for each available service path represented by the source router's data policy.

As depicted in FIG. 5, at operation 502, the process 500 includes identifying a first service path based the list of available service routes and/or the list of next-hop routers for available service routers represented by the source router's data policy. For example, in the operational example of FIG. 4, if the source router is the edge router A 402A, then either the path T(A)/Service or the T(B)/Service may be identified.

At operation 504, the process 500 includes querying the FIB table associated with the source table. For example, in the operational example of FIG. 4, the edge router A 402A may retrieve the FIB table 408.

At operation 506, the process 500 includes determining, based on the FIB table, whether the first service path corresponds to a valid network path described by the FIB table. For example, in the operational example of FIG. 4, if the first service path is T(A)/Service, then the system may determine that service path corresponds to the valid network path T(A)/VPN as represented by the forwarding data in the FIB table 408. However, if the first service path is T(B)/Service, then the system may determine that service path does not correspond to any valid network path represented by the forwarding data in the FIB table 408. Accordingly, at operation 506, service paths represented by a data policy may be filtered and/or pruned based on dynamic validity/reachability data associated with network paths as represented by an FIB table.

At operation 508, the process 500 includes transmitting the traffic based on the first service path based on (e.g., in response to) determining that the first service path corresponds to a valid network path described by the FIB table. In some cases, based on determining that the first service path corresponds to a valid network path described by the FIB table, the router transmits the traffic using that service path.

In some cases, because the adopted service path corresponds to a valid network path and because reachability of network paths is dynamically updated using conventional routing policies, the adopted service path is ensured to be reachable. For example, in the operational example of FIG. 4, because the service path T(B)/Service does not correspond to a valid network path, the service path T(B)/Service is not adopted, thus avoiding adoption of an unreachable/inactive service path that may cause traffic blackholing problems.

At operation 510, the process 500 includes refusing to transmit the network traffic based on the first service based on determining that the first service path does not correspond to a valid network path described by the FIB table. In some cases, based on determining the first service path does not correspond to a valid network path described by the FIB table, the router refuses to transmit the traffic using that service path.

FIG. 6 provides an example network topology 600 that includes three service routers, A, B, and C, that connect to each other at a core network region 610. Each service router serves a respective network region with one or more edge routers. For example, service router A 604A serves a network region A 608A that includes an edge router A 602A, service router B 604B serves a network region B 608B that includes an edge router B 602B, and service router C 604C serves a network region C 608C that includes an edge router C 602C. Additionally, one or more services may be deployed behind each service router. For example, a firewall 606A is deployed behind the service router A, a firewall 606B is deployed behind the service router B, and a firewall 606C is deployed behind the service router C. A service router depicted in FIG. 6 may be a border router.

In some cases, service insertion can cause blackholing problems in the network topology 600 of FIG. 6. For example, traffic from edge router A 602A to edge router B 602B may be sent to service router C 604C and be blackholed. The blackholing problem occurs in this scenario because the service route selection action does not consider the specific requirements and constraints of the traffic being transmitted. When the service route selection action is executed, the action identifies all the service routers hosting the specific service, without considering whether a particular service router is a viable target for the traffic being transmitted. As a result, traffic from the edge router A 602A and the edge router B 602B may be sent to service router C 604C, even though service router C 604C is not a viable target for that traffic. In some cases, sending a packet to a non-viable target can loop the packet back to the original sender, causing routing loops.

Figure 7:
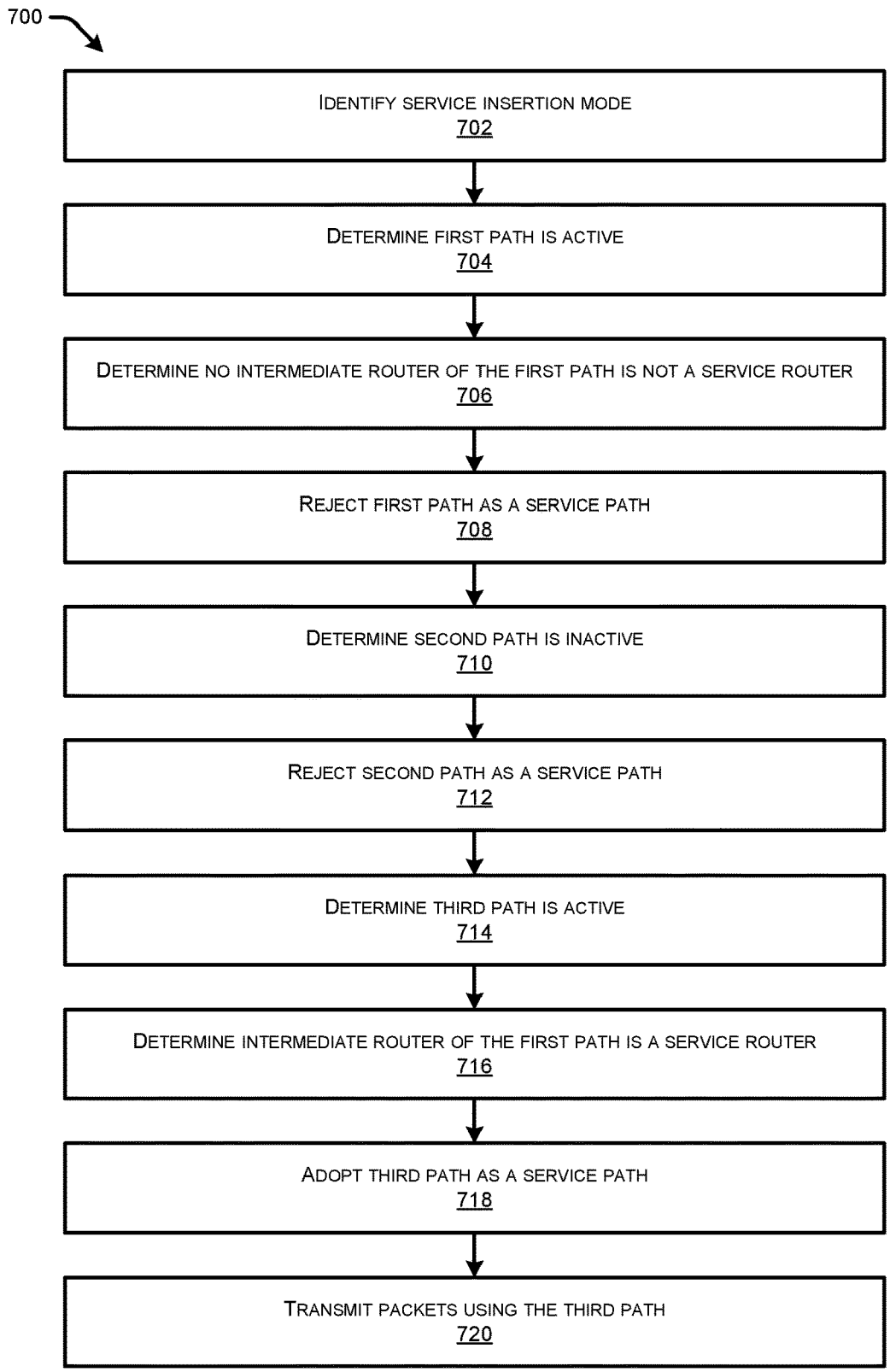
FIG. 7 is a flowchart diagram of an example process for transmitting traffic from a source router to a destination router in a service mode.

FIG. 7 is a flowchart diagram of an example process 700 for transmitting traffic from a source router to a destination router in a service mode. The process 700 may be performed by the source router.

As depicted in FIG. 7, at operation 702, the process 700 includes determining that the data transmission is to be performed using a service mode. The service mode may be used when network services, such as firewalls or intrusion detection systems, need to inspect or modify the traffic before it reaches its destination. For example, in a scenario where a company's branch office needs to access a cloud-based application, the company may want to insert a firewall service in the network path to inspect and filter the traffic before it reaches the cloud application to increase network security.

At operation 704, the process 700 includes determining that a first path between the source router and the destination router is active. In some cases, a path is determined to be active if all of the hops associated with the path are determined to be active/reachable. In some cases, determining that a first path between the source router and the destination router is active includes determining that an indication of the first path is in the routing table and/or the FIB table associated with the source router.

At operation 706, the process 700 includes determining that the first path does not include an intermediate router (e.g., a next-hop router) that satisfies the service requirement of the service mode. In some cases, determining that the first path does not include an intermediate router that satisfies the service requirement of the service mode includes determining that the data policy associated with the source router does not include an indication of an intermediate router (e.g., a next-hop router) associated with the first path. In some cases, determining that the first path does not include an intermediate router that satisfies the service requirement of the service mode includes determining that a service database does not include an indication of an intermediate router (e.g., a next-hop router) associated with the first path.

At operation 708, the process 700 includes determining that the first path is not a viable path for data transmission from the source router to the destination router during the service mode. In some cases, determining that the first path is not a viable path for data transmission from the source router to the destination router during the service mode is performed based on determining that the first path does not include an intermediate router that satisfies the service requirement of the service mode.

At operation 710, the process 700 includes determining that a second path between the source router and the destination router is not an active path. In some cases, determining that a second path between the source router and the destination router is inactive includes determining that an indication of the second path is not in the routing table and/or the FIB table associated with the source router.

At operation 712, the process 700 includes determining that the second path is not a viable path for data transmission from the source router to the destination router during the service mode. In some cases, determining that the second path is not a viable path for data transmission from the source router to the destination router during the service mode is performed based on determining that the second path is inactive.

At operation 714, the process 700 includes determining that a third path between the source router and the destination router is active. In some cases, determining that a third path between the source router and the destination router is active includes determining that an indication of the first path is in the routing table and/or the FIB table associated with the source router.

At operation 716, the process 700 includes determining that the third path does includes an intermediate router (e.g., a next-hop router) that satisfies the service requirement of the service mode. In some cases, determining that the third path includes an intermediate router that satisfies the service requirement of the service mode includes determining that the data policy associated with the source router includes an indication of an intermediate router (e.g., a next-hop router) associated with the third path. In some cases, determining that the third path includes an intermediate router that satisfies the service requirement of the service mode includes determining that a service database includes an indication of an intermediate router (e.g., a next-hop router) associated with the first path.

At operation 718, the process 700 includes determining that the third path is a viable path for data transmission from the source router to the destination router during the service mode. In some cases, determining that the third path is a viable path for data transmission from the source router to the destination router during the service mode is performed based on determining that the third path is active and/or includes an intermediate router that satisfies the service requirement of the service mode.

At operation 720, the process 700 includes transmitting data from the source router to the destination router using the third path. In some cases, transmitting data from the source router to the destination router using the third path includes forwarding the data to a next-hop router associated with the third path.

Figure 8:
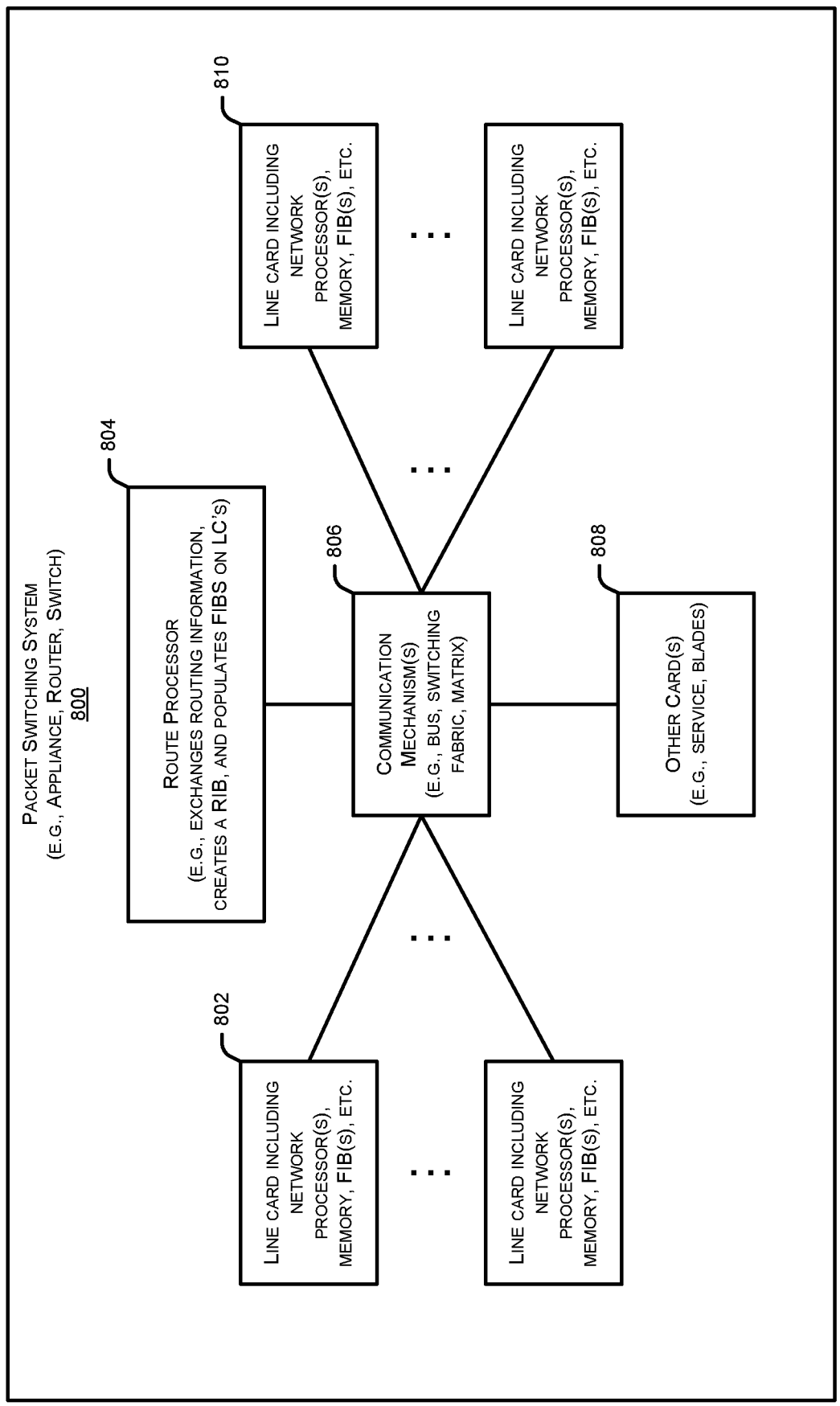
FIG. 8 illustrates a block diagram illustrating an example packet switching device (or system) that can be utilized to implement various aspects of the technologies disclosed herein.

FIG. 8 illustrates a block diagram illustrating an example packet switching device (or system) 800 that can be utilized to implement various aspects of the technologies disclosed herein. In some examples, packet switching device(s) 800 may be employed in various networks, such as an SDWAN. The packet switching device may, for example, be a branch router or an edge router.

In some examples, a packet switching device 800 may comprise multiple line card(s) 802, 810, each with one or more network interfaces for sending and receiving packets over communications links (e.g., possibly part of a link aggregation group). The packet switching device 800 may also have a control plane with one or more processing elements 806 for managing the control plane and/or control plane processing of packets associated with forwarding of packets in a network. The packet switching device 800 may also include other cards 808 (e.g., service cards, blades) which include processing elements that are used to process (e.g., forward/send, drop, manipulate, change, modify, receive, create, duplicate, apply a service) packets associated with forwarding of packets in a network. The packet switching device 800 may comprise hardware-based communication mechanism 806 (e.g., bus, switching fabric, and/or matrix, etc.) for allowing its different entities 802, 804, 808 and 810 to communicate. Line card(s) 802, 810 may typically perform the actions of being both an ingress and/or an egress line card 802, 810, in regard to multiple other particular packets and/or packet streams being received by, or sent from, packet switching device 800.

Figure 9:
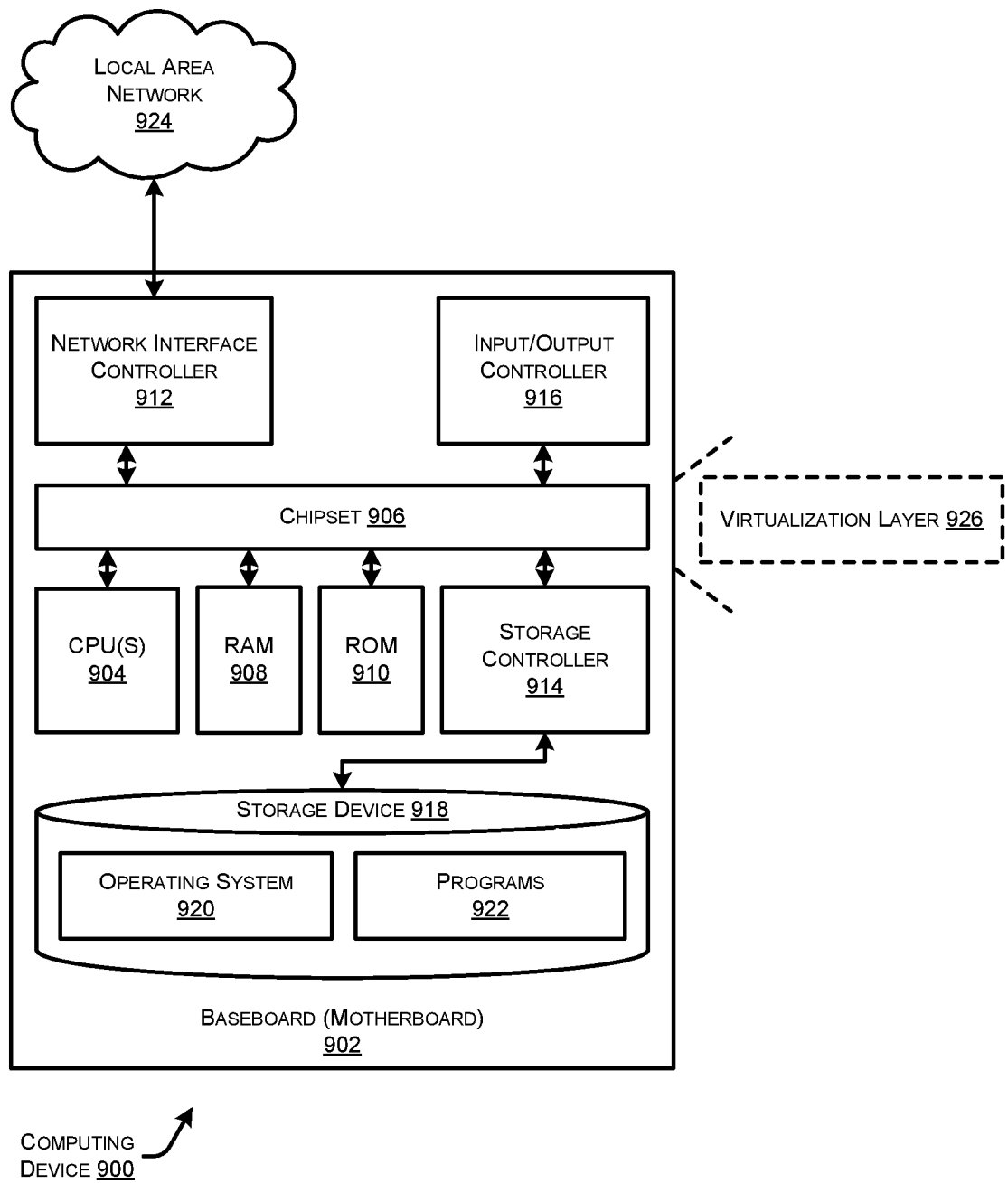
FIG. 9 shows an example computer architecture for a computing device (or network routing device) capable of executing program components for implementing the functionality described above.

FIG. 9 shows an example computer architecture for a computing device (or network routing device) 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computing device 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computing device 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computing device 900. The chipset 906 can further provide an interface to a computer-readable storage medium such as a read-only memory ("ROM") 910 or non-volatile RAM ("NVRAM") for storing basic routines that help to startup the computing device 900 and to transfer information between the various components and devices. The ROM 910 or NVRAM can also store other software components necessary for the operation of the computing device 900 in accordance with the configurations described herein.

The computing device 900 can operate in a networked environment using logical connections to remote computing devices and computer systems through a network, such as the network 924. The chipset 906 can include functionality for providing network connectivity through a NIC 912, such as a gigabit Ethernet adapter. The NIC 912 is capable of connecting the computing device 900 to other computing devices over the network 924. It should be appreciated that multiple NICs 912 can be present in the computing device 900, connecting the computer to other types of networks and remote computer systems.

The computing device 900 can be connected to a storage device 918 that provides non-volatile storage for the computing device 900. The storage device 918 can store an operating system 920, programs 922, and data, which have been described in greater detail herein. The storage device 918 can be connected to the computing device 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computing device 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 can further read information from the storage device 918 by detecting the physical states or characteristics of one or more particular locations within the physical storage units.

In addition to the mass storage device 918 described above, the computing device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 900. In some examples, the operations performed by a network, and/or any components included therein (e.g., a router, such as an edge router), may be supported by one or more devices similar to computing device 900. Stated otherwise, some or all of the operations performed by the network, and or any components included therein, may be performed by one or more computing device 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computing device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computing device 900.

In one embodiment, the storage device 918 or other computer-readable storage media is encoded with computer-executable instructions which, when loaded into the computing device 900, transform the computer from a general-purpose computing system into a special-purpose computer capable of implementing the embodiments described herein. These computer-executable instructions transform the computing device 900 by specifying how the CPUs 904 transition between states, as described above. According to one embodiment, the computing device 900 has access to computer-readable storage media storing computer-executable instructions which, when executed by the computing device 900, perform the various processes described above with regard to FIGS. 3-7. The computing device 900 can also include computer-readable storage media having instructions stored thereupon for performing any of the other computer-implemented operations described herein.

The computing device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computing device 900 might not include all of the components shown in FIG. 9, can include other components that are not explicitly shown in FIG. 9, or might utilize an architecture completely different than that shown in FIG. 9.

The computing device 900 may support a virtualization layer 926, such as one or more components associated with a computing resource network. The virtualization layer 926 may provide virtual machines or containers that abstract the underlying hardware resources and enable multiple operating systems or applications to run simultaneously on the same physical machine. The virtualization layer 926 may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 900 may also support other software layers, such as middleware, application frameworks, or databases, that provide additional abstraction and services to application developers and users. In some cases, the computing device 900 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining that a network comprising a first router, a second router, and a third router is operating in a service mode;
   determining that a first path is active based on retrieving a network path from a routing table and determining that the third router is an active intermediate router based on the network path, wherein the active intermediate router is for data transmission from the first router to the second router, and wherein the first path is associated with the third router, and further wherein determining that the first path is active comprises:
      determining, based on the routing table, that the third router is active and is an intermediate router for reaching the second router;
   determining, based on querying a service database stored on a control policy node of the network, that the third router satisfies a service requirement associated with the service mode; and
   based on determining that the first path is active and the third router satisfies the service requirement, transmitting a first packet using the first path, wherein the first packet is destined for the second router and is associated with the service mode.

2. The method of claim 1, further comprising:
   determining that the network comprises a fourth router, wherein the fourth router satisfies the service requirement;
   determining that a second path for data transmission from the first router to the second router is not active, wherein the second path is associated with the fourth router; and
   based on determining that the second path is not active, determining that the second path is not a viable service path for data transmission from the first router to the second router during the service mode.

3. The method of claim 1, further comprising:
   determining that the network comprises a fifth router;
   determining that a third path for data transmission from the first router to the second router is active, wherein the third path is associated with the fifth router;
   determining that the fifth router fails to satisfy the service requirement; and
   based on determining that the fifth router fails to satisfy the service requirement, determining that the third path is not a viable service path for data transmission from the first router to the second router during the service mode.

4. The method of claim 1, further comprising:
   determining that a forwarding information base table associated with the first path comprises an indication of the first path; and
   based on determining that the forwarding information base table comprises the indication, determining that the first path is active.

5. The method of claim 1, further comprising:
   determining that the service mode is enabled by a first control policy.

6. The method of claim 1, further comprising:
   determining that the service mode is enabled by a first data policy; and
   based on determining that the service mode is enabled by the first data policy, determining that the first path satisfy the service requirement by determining whether the first data policy associates the third router with the service requirement.

7. The method of claim 1, further comprising:
   subsequent to adopting the first path, receiving an indication that at least one route associated with the first path is withdrawn;

determining, based on the indication, that the first path is no longer active; and subsequent to determining that the first path is no longer active, rejecting the first path as a viable service path.

8. The method of claim 1, wherein the first router, the second router, and the third router are border routers.

9. The method of claim 1, wherein the first router and second router are edge routers while the third router is a transport router.

10. A system comprising:
one or more processors; and
one or more computer-readable media storing computer-executable instructions that, when executed by the one or more processors, cause the one or more processors to perform operations comprising:
determining that a network comprising a first router, a second router, and a third router is operating in a service mode;
determining that a first path is active based on retrieving a network path from a routing table and determining that the third router is an active intermediate router based on the network path, wherein the active intermediate router is for data transmission from the first router to the second router, and wherein the first path is associated with the third router, and further wherein determining that the first path is active comprises:
determining, based on the routing table, that the third router is active and is an intermediate router for reaching the second router;
determining, based on querying a service database stored on a control policy node of the network, that the third router satisfies a service requirement associated with the service mode; and
based on determining that the first path is active and the third router satisfies the service requirement, transmitting a first packet using the first path, wherein the first packet is destined for the second router and is associated with the service mode.

11. The system of claim 10, the operations further comprising:
determining that the network comprises a fourth router, wherein the fourth router satisfies the service requirement;
determining that a second path for data transmission from the first router to the second router is not active, wherein the second path is associated with the fourth router; and
based on determining that the second path is not active, determining that the second path is not a viable service path for data transmission from the first router to the second router during the service mode.

12. The system of claim 10, the operations further comprising:
determining that the network comprises a fifth router;
determining that a third path for data transmission from the first router to the second router is active, wherein the third path is associated with the fifth router;
determining that the fifth router fails to satisfy the service requirement; and
based on determining that the fifth router fails to satisfy the service requirement, determining that the third path is not a viable service path for data transmission from the first router to the second router during the service mode.

13. The system of claim 10, the operations further comprising:
determining that a forwarding information base table associated with the first path comprises an indication of the first path; and
based on determining that the forwarding information base table comprises the indication, determining that the first path is active.

14. One or more non-transitory computer-readable media storing computer-executable instructions that, when executed by one or more processors, cause the one or more processors to perform operations comprising:
determining that a network comprising a first router, a second router, and a third router is operating in a service mode;
determining that a first path is active based on retrieving a network path from a routing table and determining that the third router is an active intermediate router based on the network path, wherein the active intermediate router is for data transmission from the first router to the second router, and wherein the first path is associated with the third router, and further wherein determining that the first path is active comprises:
determining, based on the routing table, that the third router is active and is an intermediate router for reaching the second router;
determining, based on querying a service database stored on a control policy node of the network, that the third router satisfies a service requirement associated with the service mode; and
based on determining that the first path is active and the third router satisfies the service requirement, transmitting a first packet using the first path, wherein the first packet is destined for transmission to the second router and is associated with the service mode.

15. The one or more non-transitory computer-readable media of claim 14, the operations further comprising:
determining that the network comprises a fourth router, wherein the fourth router satisfies the service requirement;
determining that a second path for data transmission from the first router to the second router is not active, wherein the second path is associated with the fourth router; and
based on determining that the second path is not active, determining that the second path is not a viable service path for data transmission from the first router to the second router during the service mode.

16. The one or more non-transitory computer-readable media of claim 14, the operations further comprising:
determining that the network comprises a fifth router;
determining that a third path for data transmission from the first router to the second router is active, wherein the third path is associated with the fifth router;
determining that the fifth router fails to satisfy the service requirement; and
based on determining that the fifth router fails to satisfy the service requirement, determining that the third path is not a viable service path for data transmission from the first router to the second router during the service mode.

17. The one or more non-transitory computer-readable media of claim 14, the operations further comprising:
determining that a forwarding information base table associated with the first path comprises an indication of the first path; and based on determining that the forwarding information base table comprises the indication, determining that the first path is active.

\* \* \* \* \*